(12) United States Patent
Higuchi et al.

(10) Patent No.: US 11,285,990 B2
(45) Date of Patent: Mar. 29, 2022

(54) STEERING COLUMN DEVICE

(71) Applicant: FUJI KIKO CO., LTD., Shizuoka (JP)

(72) Inventors: Kouta Higuchi, Shizuoka (JP); Kentaro Kikuiri, Shizuoka (JP)

(73) Assignee: FUJI KIKO CO., LTD., Shizuoka (JP)

( * ) Notice: Subject to any disclaimer, the term of this patent is extended or adjusted under 35 U.S.C. 154(b) by 0 days.

(21) Appl. No.: 16/936,660

(22) Filed: Jul. 23, 2020

(65) Prior Publication Data

US 2021/0024117 A1 Jan. 28, 2021

(30) Foreign Application Priority Data

Jul. 25, 2019 (JP) .............................. JP2019-136967

(51) Int. Cl.
- *B62D 1/187* (2006.01)
- *B62D 1/185* (2006.01)

(52) U.S. Cl.
CPC .............. *B62D 1/187* (2013.01); *B62D 1/185* (2013.01)

(58) Field of Classification Search
CPC ......... B62D 1/184; B62D 1/185; B62D 1/187
See application file for complete search history.

(56) References Cited

U.S. PATENT DOCUMENTS

| | | | |
|---|---|---|---|
| 5,979,265 A | 11/1999 | Kim et al. | |
| 6,467,807 B2 * | 10/2002 | Ikeda | B62D 1/184 280/775 |
| 7,726,691 B2 * | 6/2010 | Yamada | B62D 1/192 280/775 |
| 8,505,407 B2 * | 8/2013 | Nomura | B62D 1/185 74/493 |
| 8,967,017 B2 * | 3/2015 | Osawa | B62D 1/184 74/495 |
| 9,180,902 B2 * | 11/2015 | Nagasawa | B22D 19/045 |
| 2003/0000330 A1 | 1/2003 | Murakami et al. | |
| 2010/0242664 A1 | 9/2010 | Thompson et al. | |
| 2017/0057537 A1 | 3/2017 | Handy et al. | |

FOREIGN PATENT DOCUMENTS

| | | |
|---|---|---|
| JP | 2010-105662 A | 5/2010 |
| JP | 2011006056 A | 1/2011 |

OTHER PUBLICATIONS

Extended European Search Report dated Nov. 26, 2020 for application No. EP 20187290.0.

* cited by examiner

*Primary Examiner* — Laura Freedman
(74) *Attorney, Agent, or Firm* — Nath, Goldberg & Meyer; Jerald L. Meyer

(57) ABSTRACT

A steering column device includes: a vehicle-body attachment bracket configured to be fixed to a vehicle body and having a pair of sidewall portions; and an outer jacket arranged between the pair of sidewall portions along a vehicle front-rear direction. In addition, the steering column device includes: an inner jacket inserted in the outer jacket to be movable in a tube-axial direction; and a distance bracket having a long hole open along the vehicle front-rear direction and attached to the outer jacket. The distance bracket has a slit having an open end in the opposite direction to that of a slit of the outer jacket and is arranged such that the slit of the distance bracket is set over the slit of the outer jacket in a tube radial direction.

2 Claims, 3 Drawing Sheets

STEERING COLUMN DEVICE

CROSS REFERENCE TO RELATED APPLICATIONS

The present application is based on, and claims priority from Japanese Patent Application No. 2019-136967, filed Jul. 25, 2019, the disclosure of which is hereby incorporated by reference herein in its entirety.

BACKGROUND

1. Technical Field

The present invention relates to a steering column device.

2. Description of the Related Art

A steering column device according to Japanese Patent Application Publication No. 2011-6056 includes: a vehicle-body attachment bracket configured to be fixed to a vehicle body and having a pair of sidewall portions; and an outer jacket arranged between the pair of sidewall portions along a vehicle front-rear direction. In addition, the steering column device includes: an inner jacket inserted in the outer jacket to be movable in a tube-axial direction; and a distance bracket having long holes open along the vehicle front-rear direction and attached to the outer jacket. A slit having an open end on one side in the vehicle front-rear direction is formed in the outer jacket, and the long holes open along the vehicle front-rear direction are formed in the distance bracket, which is attached to the outer jacket.

SUMMARY

In the above steering column device, the distance bracket has a left-right divided structure and the outer jacket was reduced in diameter by a bolt-axial force to fix the inner jacket to the outer jacket. In the steering column device having such a structure, the positional relation between the bolt and the open end of the slit changes depending on the positions of the long holes, and thus the jacket tightening rigidity changes depending on the positions of the long holes. For this reason, the lever operating force and the position fixing force (the telescopic position fixing force, the tilt position fixing force) in the steering column device are unlikely to be stabilized.

In view of this, an object of the present invention is to stabilize the lever operating force and the position fixing force in a steering column device regardless of the positions of long holes.

A steering column device according to one aspect of the present invention includes: a vehicle-body attachment bracket configured to be fixed to a vehicle body and having a pair of sidewall portions; an outer jacket arranged between the pair of sidewall portions along a vehicle front-rear direction; an inner jacket inserted in the outer jacket to be movable in a tube-axial direction; and a distance bracket having a long hole open along the vehicle front-rear direction and attached to the outer jacket. The outer jacket has a slit having an open end on one side in the vehicle front-rear direction. The distance bracket has a slit having an open end on an opposite side in the vehicle front-rear direction, and is arranged such that the slit of the distance bracket is set over the slit of the outer jacket in a tube radial direction.

According to the steering column device of the one aspect of the present invention, it is possible to stabilize the lever operating force and the position fixing force in a steering column device regardless of the position of long holes.

DESCRIPTION OF EMBODIMENTS

Figure 1:
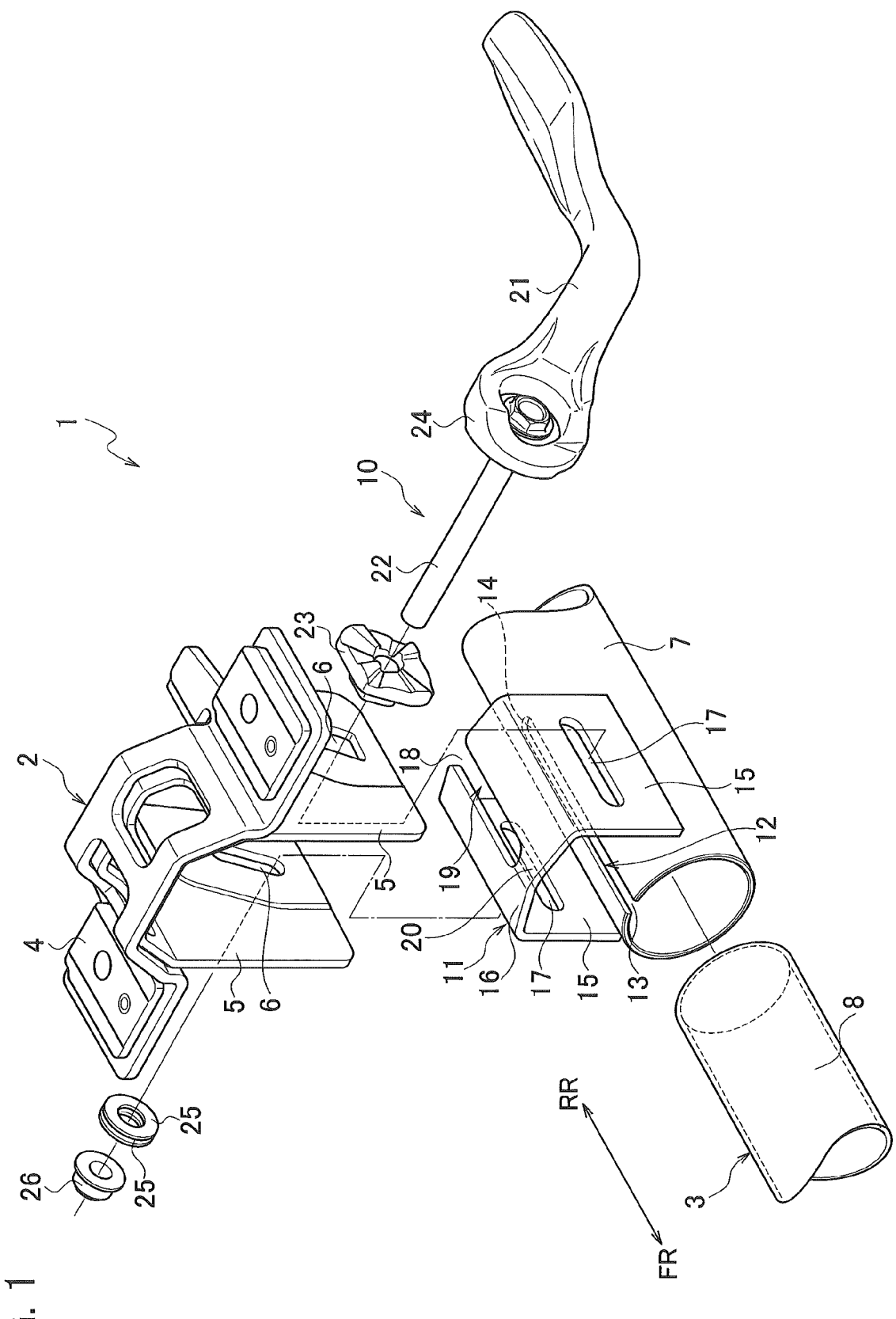
FIG. 1 is a schematic exploded perspective view illustrating a steering column device according to an embodiment of the present invention.

Hereinafter, an embodiment of the present invention will be described in detail with the drawings.

Note that in the drawings, the arrow FR indicates a vehicle front side in a vehicle front-rear direction and the arrow RR indicates a vehicle rear side in the vehicle front-rear direction.

A steering column device 1 according to the present embodiment illustrated in FIG. 1 is a manual type. In addition, as illustrated in FIG. 1, the steering column device 1 includes: a vehicle-body attachment bracket 2 configured to be fixed to a vehicle body; and a steering column 3 supported by the vehicle-body attachment bracket 2 to be swingable in a vehicle up-down direction (such that the tilt position is adjustable).

The vehicle-body attachment bracket 2 includes a fixation portion 4 configured to be fixed to a ceiling surface (not illustrated) of the vehicle body. From the fixation portion 4, a pair of sidewall portions 5, 5 hang down. In each sidewall portion 5, a long hole (tilt long hole) 6 configured to define a tilt position adjustment range along the vehicle up-down direction (tilt direction) is open. Each tilt long hole 6 is formed of an arc-shaped long hole centered at a shaft support portion which is not illustrated.

The steering column 3 is mainly formed of: an inner jacket 8 arranged between the pair of sidewall portions 5, 5; and an outer jacket 7 supported to be slidable in the vehicle front-rear direction relative to the inner jacket 8 (such that the telescopic position is adjustable). The steering column 3 is provided with a lock mechanism 10 configured to integrally tighten the vehicle-body attachment bracket 2, the outer jacket 7, and the inner jacket 8.

Figure 2:
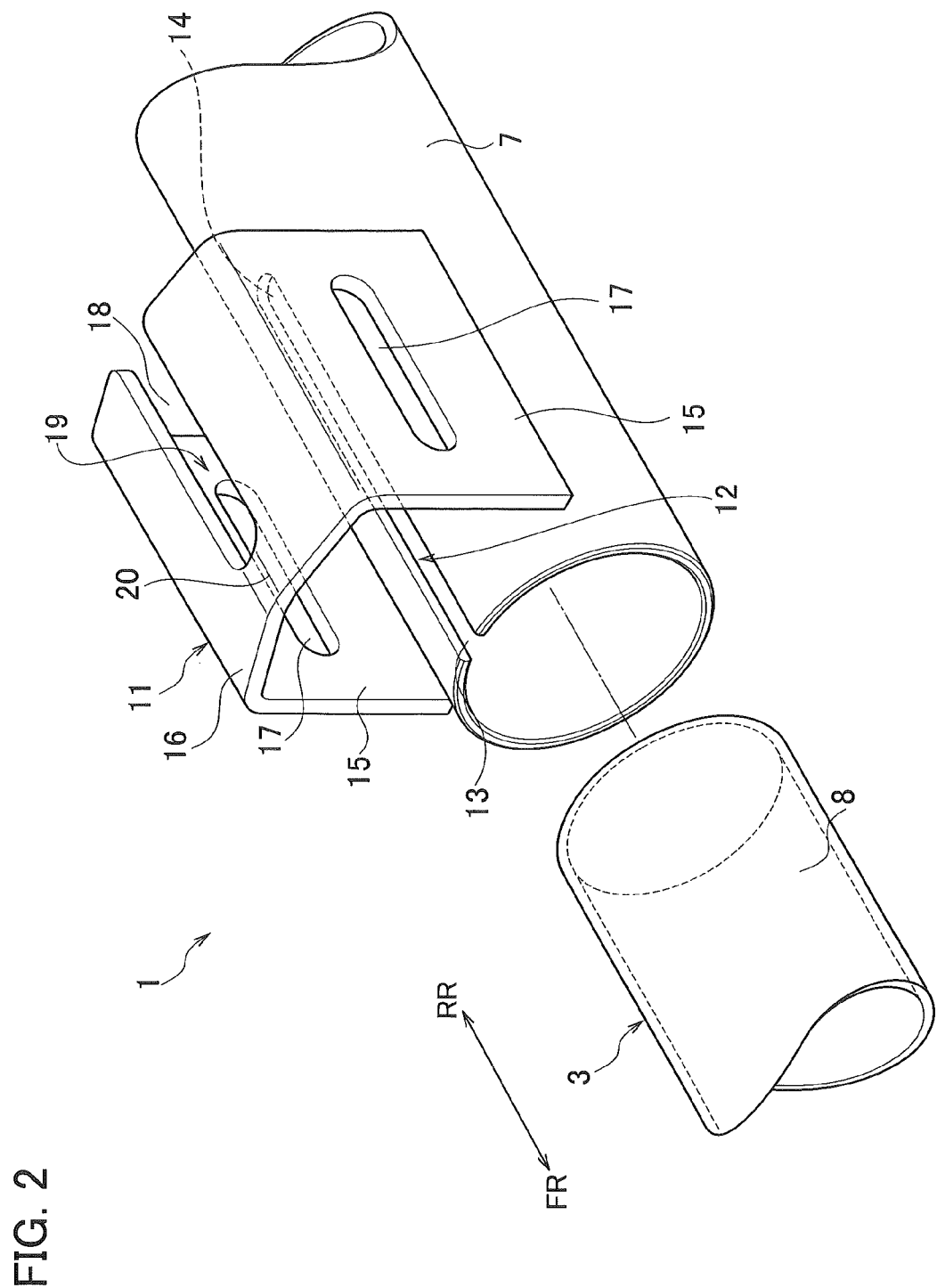
FIG. 2 is an exploded perspective view illustrating a main part of the steering column device according to the embodiment of the present invention.

As illustrated in FIG. 1 and FIG. 2, the outer jacket 7 is formed into a cylindrical shape, and the inner jacket 8 is inserted inside the cylinder in a cylinder-axial direction, such that the outer jacket 7 is supported to be slidable in the cylinder-axial direction relative to the inner jacket 8. In addition, a distance bracket 11 is attached to the outer periphery of the outer jacket 7. The outer jacket 7 is configured to be held at a desired tilt position by the distance bracket 11 being held between the pair of sidewall portions 5, 5.

In the upper face of the outer jacket 7, a slit (jacket-side slit) 12 is formed.

Hence, the vehicle body front-side end portion of the jacket-side slit 12 is open at the vehicle body front-side end face of the outer jacket 7 such that an open end 13 is formed. On the other hand, the vehicle body rear-side end portion of the jacket-side slit 12 is not open at the vehicle body rear-side end face of the outer jacket 7 such that a closed end 14 is formed. The width of the jacket-side slit 12 is, for example, approximately 5 mm and is made to be uniform in the tube-axial direction.

The inner jacket 8 is formed into a cylindrical shape and arranged between the pair of sidewall portions 5, 5 along the vehicle front-rear direction. The inner jacket 8 includes a shaft support portion (not illustrated) at the front end-side portion, and the shaft support portion is pivotally supported on the vehicle body such that the rear end-side portion of the inner jacket 8 swings in the vehicle up-down direction.

Note that a steering shaft (not illustrated) is pivotally supported inside the cylinders of the inner jacket 8 and the outer jacket 7.

The distance bracket 11 is formed into a substantially U-shape, having: a pair of sliding contact walls 15, 15 extending in the vehicle up-down direction; and a coupling portion 16 coupling the upper edges of the pair of sliding contact walls 15, 15 in the vehicle width direction. The lower edge portion of each sliding contact wall 15 is welded to the outer periphery of the outer jacket 7. Moreover, each sliding contact wall 15 is provided with a long hole (telescopic long hole) 17 formed of a long hole open along the cylinder-axial direction and configured to define a telescopic position adjustment range.

In the coupling portion 16 of the distance bracket 11, a slit (bracket-side slit) 19 having an open end 18 extending in the opposite direction to that of the jacket-side slit 12 is formed.

Hence, the vehicle body rear-side end portion of the bracket-side slit 19 is open at the vehicle body rear-side end face of the coupling portion 16 such that the open end 18 is formed. On the other hand, the vehicle body front-side end portion of the bracket-side slit 19 is not open at the vehicle body front-side end face of the coupling portion 16 such that a closed end 20 is formed. The width of the bracket-side slit 19 is substantially equal to the width of the jacket-side slit 12, is, for example, approximately 5 mm, and is made to be uniform in the tube-axial direction.

In addition, with the intention to make the distance bracket 11 easily deformable (deflectable) by the bolt-axial force, the coupling portion 16 of the distance bracket 11 is formed into an arch shape bent from the vehicle up-down direction.

Figure 3:
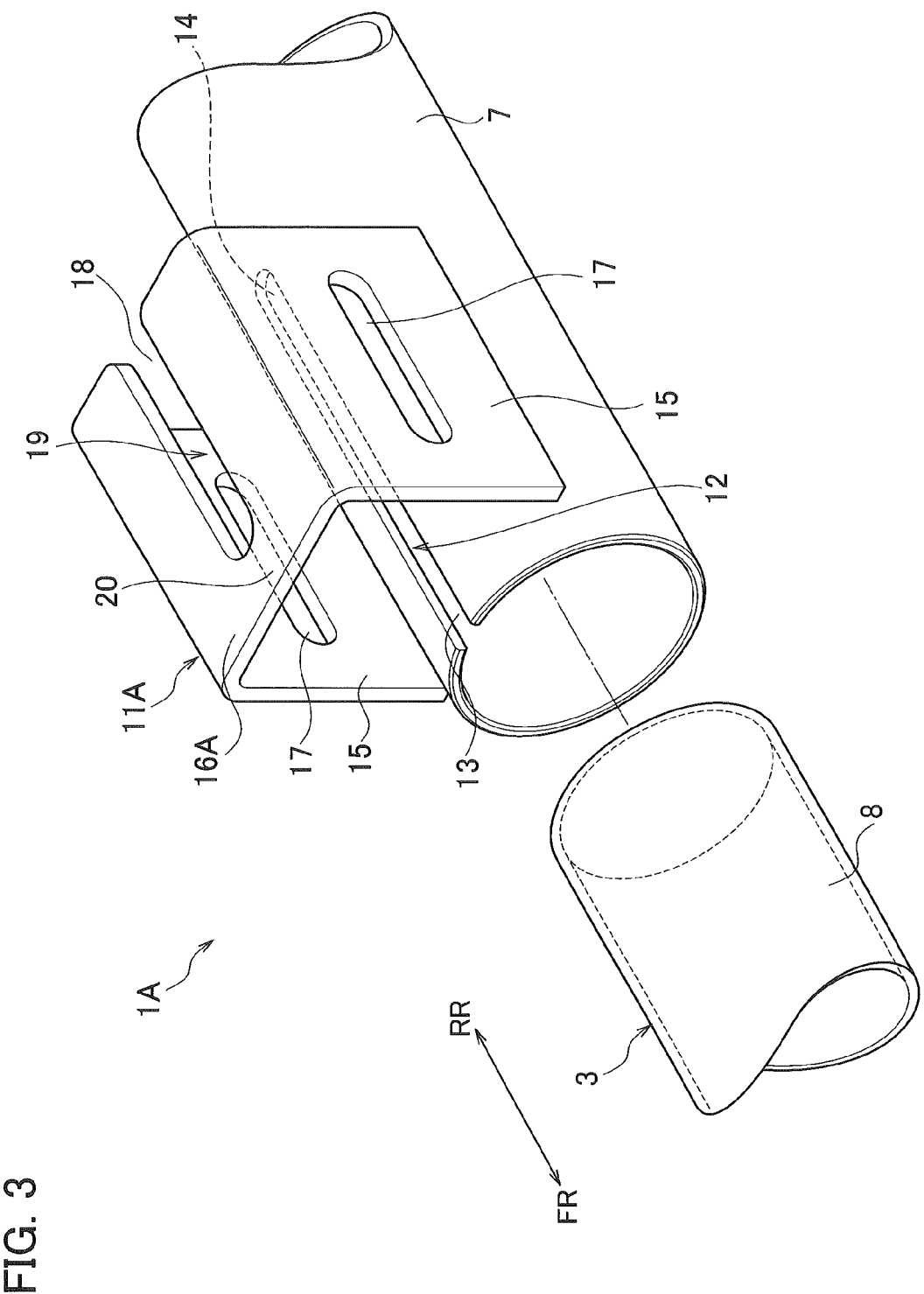
FIG. 3 is an exploded perspective view illustrating a main part of a steering column device according to a modification.

Note that as in a steering column device 1A illustrated in FIG. 3, a coupling portion 16A of a distance bracket 11A may be formed into a flat shape.

The lock mechanism 10 includes an operation lever 21, an operation shaft (tilt bolt) 22, a stationary cam 23, a rotating cam 24, thrust bearings 25, 25, and a nut 26.

The operation shaft 22 penetrates the tilt long holes 6 of the pair of sidewall portions 5, 5 and the telescopic long holes 17 of the distance bracket 11 in the vehicle width direction and is supported to be turnable about the shaft. In addition, the operation shaft 22 is provided with the operation lever 21 on the one end-side end portion and is supported by the sidewall portion 5 on the one end side. The opposite end-side end portion of the operation shaft 22 penetrates the sidewall portion 5 on the opposite end side and is then screwed into the nut 26, and the thrust bearings 25, 25 are held between the nut 26 and the sidewall portion 5 on the opposite end side. On a portion of the operation shaft 22 located between the operation lever 21 and the sidewall portion 5 on the one end side, the stationary cam 23 and the rotating cam 24 are arranged.

The stationary cam 23 is formed into such a ring shape that the operation shaft 22 penetrates the center portion of the stationary cam 23, and is arranged such that the stationary cam surface of the stationary cam 23 faces the operation lever 21 side. In addition, the stationary cam 23 is arranged such that the opposite side of the stationary cam 23 to the stationary cam surface is fitted in the tilt long hole 6 and in the telescopic long hole 17, and the stationary cam 23 does not rotate about the operation shaft 22 and is movable in the tilt long hole 6 and the telescopic long hole 17. On the stationary cam surface, projections and depressions are alternately formed in the circumferential direction.

The rotating cam 24 is formed into such a ring shape that the operation shaft 22 penetrates the center portion of the rotating cam 24, and is arranged such that the rotating cam surface of the rotating cam 24 faces the stationary cam surface. In addition, the rotating cam 24 is formed together with the penetrating operation shaft 22 integrally on the operation lever 21 such that the rotating cam 24 rotates integrally with the operation lever 21 about the operation shaft 22. On the rotating cam surface, projections and depressions are alternately formed in the circumferential direction.

Next, the procedure of operating the steering column device 1 of the present embodiment will be described.

To fix the outer jacket 7 at a desired position, the outer jacket 7 is first moved to the desired position in the tilt direction (vehicle up-down direction) and the telescopic direction (vehicle front-rear direction), and the operation lever 21 is swung upward. Swinging the operation lever 21 upward turns the operation shaft 22 in the tightening direction about the shaft.

As the operation shaft 22 is turned in the tightening direction, the projections of the stationary cam 23 and the projections of the rotating cam 24 face each other to increase the dimension in the axial direction. This tightens up the operation shaft 22, so that the sliding contact walls 15 of the distance bracket 11 are held between the pair of sidewall portions 5, 5 and the outer jacket 7 is held at the desired position.

In addition, to adjust the position of the outer jacket 7, the tightening of the inner jacket 8 and the outer jacket 7 to the vehicle-body attachment bracket 2 is released. For this, the operation lever 21 is first swung downward. Swinging the operation lever 21 downward turns the operation shaft 22 in the tightening releasing direction about the shaft.

As the operation shaft 22 is turned in the tightening releasing direction, the projections of the stationary cam 23 and the depressions of the rotating cam 24 face each other to reduce the dimension in the axial direction. This loosens the operation shaft 22 to increase the interval between the pair of sidewall portions 5, 5 and release the pressure contact of the sidewall portions 5 and the sliding contact walls 15 of the distance bracket 11, so that the outer jacket 7 becomes movable relative to the vehicle-body attachment bracket 2 in the tilt direction and the telescopic direction.

The operations and effects of the present embodiment will be described below.

(1) The steering column device 1 includes: the vehicle-body attachment bracket 2 configured to be fixed to a vehicle body and having the pair of sidewall portions 5, 5; and the outer jacket 7 arranged between the pair of sidewall portions 5, 5 along the vehicle front-rear direction. In addition, the steering column device 1 includes: the inner jacket 8 inserted in the outer jacket 7 to be movable in the tube-axial direction; and the distance bracket 11 having the long holes (telescopic long holes) 17 open along the vehicle front-rear direction and attached to the outer jacket 7. The outer jacket 7 has the slit (jacket-side slit) 12 having the open end 13 on one side in the vehicle front-rear direction. The distance bracket 11 has the slit (bracket-side slit) 19 having the open end 18 on the opposite side in the vehicle front-rear direction, and is arranged such that the bracket-side slit 19 is set over the jacket-side slit 12 in the tube radial direction.

Forming the bracket-side slit 19 having the open end 18 in the opposite direction to that of the jacket-side slit 12 in the distance bracket 11 makes it possible to reduce a variation in rigidity of the distance bracket 11 depending on the position of the telescopic long holes 17. For this reason, it is possible to make uniform differences in rigidity of the distance bracket 11 depending on the position of the telescopic long holes 17, and thus to more stabilize the lever operating force and the position fixing force (the telescopic position fixing force and the tilt position fixing force) in the steering column device 1.

(2) The distance bracket 11 has the pair of sliding contact walls 15, 15 extending in the vehicle up-down direction and the coupling portion 16 coupling the pair of sliding contact walls 15, 15 in the vehicle width direction, and the coupling portion 16 is formed into the arch shape bent from the vehicle up-down direction.

Forming the coupling portion 16 of the distance bracket 11 into the arch shape makes it possible to make the distance bracket 11 easily deformable (deflectable) by the bolt-axial force. For this reason, it is possible to make uniform differences in rigidity of the distance bracket 11 depending on the position of the telescopic long hole 17 and thus to more stabilize the lever operating force and the position fixing force (the telescopic position fixing force and the tilt position fixing force) in the steering column device 1.

It should be noted that although the steering column device of the present invention has been described using the above-described embodiment as an example, not only this embodiment but also various other embodiments may be employed without departing from the scope of the present invention.

What is claimed is:

1. A steering column device comprising:
  a vehicle-body attachment bracket configured to be fixed to a vehicle body and having a pair of sidewall portions;
  an outer jacket arranged between the pair of sidewall portions along a vehicle front-rear direction;
  an inner jacket inserted in the outer jacket to be movable in a tube-axial direction; and
  a distance bracket having a long hole open along the vehicle front-rear direction and attached to the outer jacket,
  wherein the outer jacket has a slit having an open end on one side in the vehicle front-rear direction and a closed end on an opposite side in the vehicle front-rear direction,
  and wherein the distance bracket has a slit having an open end on the opposite side in the vehicle front-rear direction and a closed end on said one side in the vehicle front-rear direction, and is arranged such that the slit of the distance bracket is set over the slit of the outer jacket in a tube radial direction.

2. The steering column device according to claim 1, wherein
  the distance bracket has: a pair of sliding contact walls extending in a vehicle up-down direction; and a coupling portion coupling the pair of sliding contact walls in a vehicle width direction, and the coupling portion is formed into an arch shape bent from the vehicle up-down direction.

* * * * *